United States Patent [19]

Lermann et al.

[11] Patent Number: 4,466,718

[45] Date of Patent: Aug. 21, 1984

[54] AUTOMATIC EXPOSURE CONTROL FOR AUTOMATIC-FOCUS CAMERAS

[75] Inventors: Peter Lermann, Narring; István Cocron, Munich; Günter Fauth, Unterhaching, all of Fed. Rep. of Germany

[73] Assignee: Agfa-Gevaert AG, Leverkusen, Fed. Rep. of Germany

[21] Appl. No.: 205,976

[22] Filed: Nov. 12, 1980

Related U.S. Application Data

[63] Continuation of Ser. No. 2,932, Jan. 12, 1979, Pat. No. 4,324,463.

[30] Foreign Application Priority Data

Jan. 13, 1978 [DE] Fed. Rep. of Germany ....... 2801383

[51] Int. Cl.³ .................. G03B 3/10; G03B 7/093
[52] U.S. Cl. .................... 354/408; 354/432; 354/458
[58] Field of Search ............. 354/25 R, 25 A, 25 P, 354/25 N, 42, 43, 44, 50, 51, 230, 234, 235, 267, 266, 268, 271, 195; 352/140; 356/1, 4; 250/204

[56] References Cited

U.S. PATENT DOCUMENTS

| | | |
|---|---|---|
| 3,274,914 | 9/1966 | Biedermann et al. ............... 354/25 |
| 3,617,128 | 11/1971 | Harvey ................................. 356/4 |
| 3,623,412 | 11/1971 | Kitai .................................... 354/50 |
| 3,713,371 | 1/1973 | Kurihara et al. ................. 354/25 N |
| 3,830,571 | 8/1974 | Imai et al. ........................ 354/25 X |
| 3,945,023 | 3/1976 | Stauffer .............................. 354/25 |

Primary Examiner—William B. Perkey
Attorney, Agent, or Firm—Michael J. Striker

[57] ABSTRACT

When a trigger lever is depressed, both a focus adjuster ring and a control disk commence to rotate in unison, driven by a spring mechanism. Position-sensing switches receive signals indicating which subject-distance setting the focus adjuster ring should be arrested at, and furthermore are opened and closed by the control disk during movement of the latter. When the focus adjuster ring reaches the required subject distance setting, it is arrested and kept arrested, thereby completing an automatic focussing operation, but the control disk continues to turn on to its end position, at which it causes the shutter mechanism of the camera to open and furthermore the exposure-timing circuit of the camera to initiation a scene-light-dependent exposure-timing operation.

1 Claim, 9 Drawing Figures

AUTOMATIC EXPOSURE CONTROL FOR AUTOMATIC-FOCUS CAMERAS

This is a continuation of application Ser. No. 002,932, filed Jan. 12, 1979, now U.S. Pat. No. 4,324,463.

BACKGROUND OF THE INVENTION

The present invention relates to photographic still or motion-picture cameras, of the type provided with some sort of focussing system generating signals dependent upon what the subject-distance setting of the camera ought to be, such signals controlling, in one way or another, the setting of the camera objective by means of an electromagnetic control device, the camera furthermore being provided with an electronic exposure-duration control circuit which performs a timing operation in dependence upon detected scene-light level.

SUMMARY OF THE INVENTION

It is the general object of the present invention to provide a camera of the type identified above, of such a design that, in an extremely simple way, the automatic exposure-duration timing operation is initiated, and the exposure itself is initiated, upon completion of the automatic focussing operation, and utilizing a great many components in common for both the functions attendant to automatic focussing and for the functions attendant to exposure initiation, exposure-timing and exposure termination. The components involved are to be as simple as possible, as the number of double or dual, or even triple functions, performed by various ones of these components is to be maximized, to keep the number of components low.

In accordance with the present invention, in particular certain preferred embodiments thereof the number of dual-purpose or even triple-purpose components and functional overlaps as among various components and combinations of components of the camera can be made very extreme, for example so extreme that only a single electromagnet is employed, as the sole electromechanical moving means employed for automatic focussing, thereafter for automatic aperture-size establishment, and thereafter for exposure initiation and/or termination.

In common to the various embodiments disclosed herein is a particular mechanical action involving the change of energization state of an electromagnetic means. In particular, a focus adjuster structure and a control structure, when released are driven by a drive-spring in unison through a succession of positions, corresponding especially in the case of the focus adjuster structure to a succession of subject distance ranges. Position-sensing switches, activated successively by the control structure, inform the system of the instaneous position of the focus adjuster structure, and when the latter reaches required setting, an electromagnetic device arrests it in such position, or causes it to be arrested in this position through intermediary arresting mechanisms, whereupon the control structure continues to move towards an end position, at which it causes the exposure to be initiated, and may also initiate operation of the exposure-timing circuitry.

Alternatively, i.e., instead of a focus adjuster structure an aperture-size adjuster structure may be involved, and after the latter is arrested the control structure, likewise, continues to move on to subsequently initiate an exposure and/or an exposure-timing operation. It is expressly contemplated, also, that the control disk first control the focussing operation to completion thereof, then the aperture-size adjustment to completion thereof, and only after both have been performed actually initiate the exposure.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
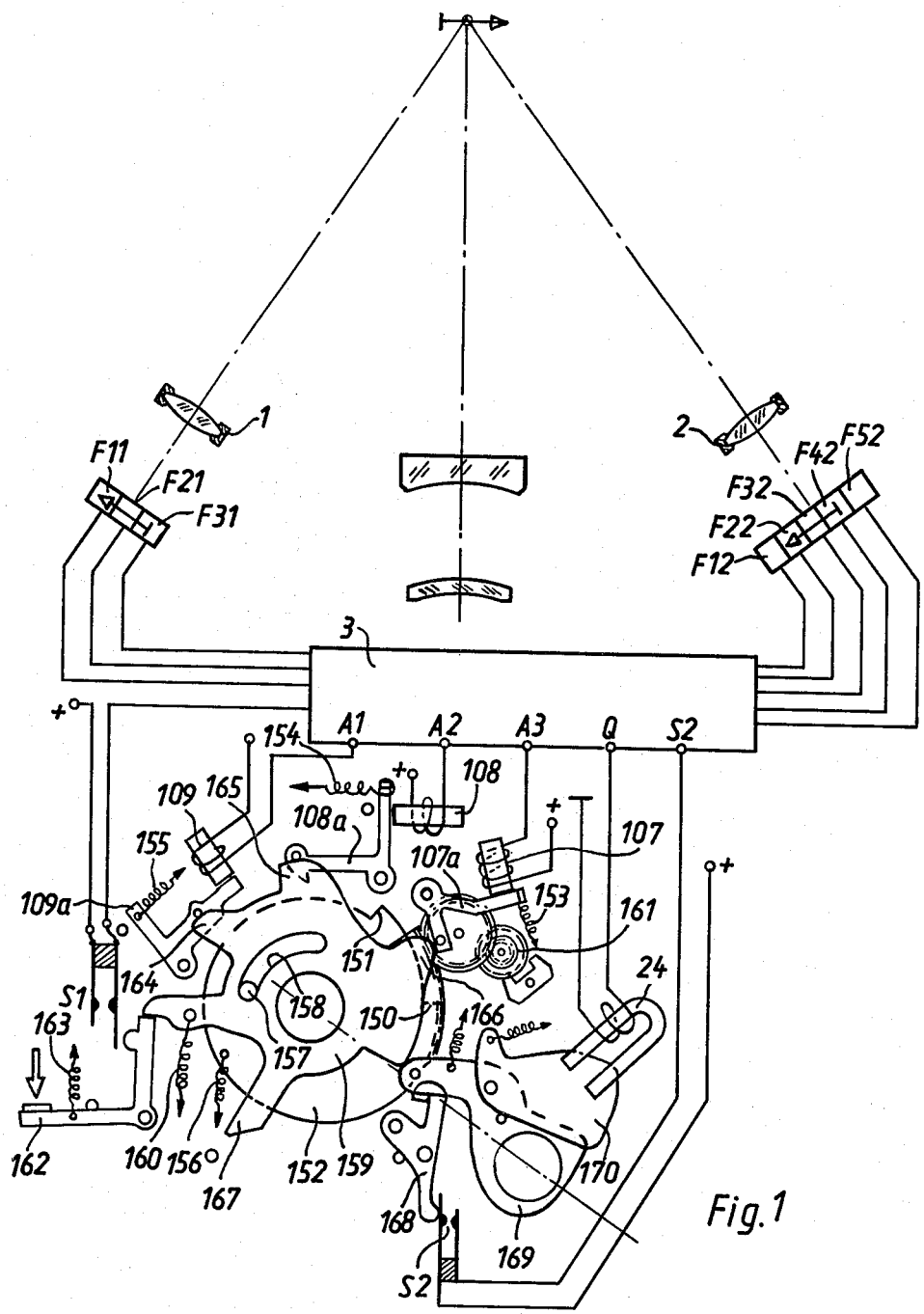
FIGS. 1 and 2 depict a first exemplary embodiment.
Figure 2:
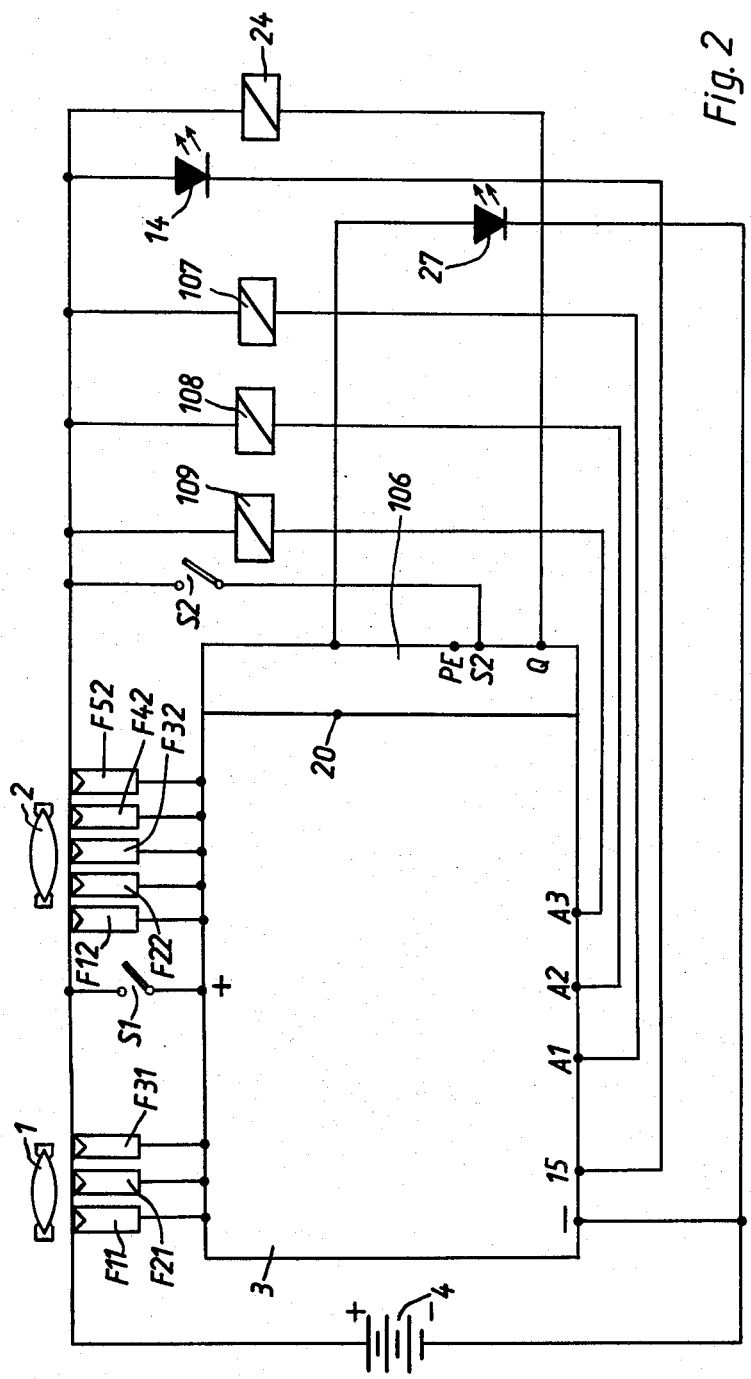

As shown in FIGS. 1 and 2, a first photodetector arrangement comprises three photodetectors F11, F21, F31, with a first optics 1 arranged in front of it. A second photodetector arrangement comprises five photodetectors F12, F22, F32, F42, F52, with a second optics 2 arranged in front of it. Both the first and second optics, and the first and second photodetector arrangements, are immovably mounted on the camera housing. The first and second optics, and the first and second photodetector arrangements, are so arranged that, when the camera is aimed at a subject to be photographed, the subject forming the basis of the subject-distance measurement, or a certain sector of such subject, is always imaged onto the entirety of the first photodetector arrangement F11, F21, F31; however, the image corresponding to the image cast onto the first photodetector arrangement is cast onto a first, second or third three-photodetector photodetector group within the second photodetector arrangement, i.e., is cast onto photodetectors F12, F22, F32 or F22, F32, F42 or F32, F42, F52, depending upon the true distance to the subject forming the basis of the subject-distance measurement. This effect occurs so long as the true distance to the subject corresponds, at least, to those subject-distance settings or ranges which the system is to furnish. The focal lengths of the first and second optics 1, 2 are so selected that, so long as the subject distance corresponds to any of the subject-distance settings or ranges to be furnished, the images cast onto the first and second photodetector arrangements are at least fairly sharp. The subject-distance measurement here performed is based upon the principle of triangulation, and the distance between the two optics 1, 2 constitutes the base of the triangulation performed.

For example, if the distance to the subject corresponds to the lowest subject-distance setting which the system is to furnish, then the image cast onto the first photodetector arrangement F11, F21, F31 finds its counterpart in the image cast onto the first photodetector group F12, F22, F32 of the second photodetector arrangement F12 to F52.

If the distance to the subject corresponds to the next subject-distance setting which the system is to furnish, then the image cast onto the first photodetector arrangement F11, F21, F31 finds its counterpart in the image cast onto the second photodetector group F22, F32, F42 of the second photodetector arrangement.

If the distance to the subject corresponds to the third subject-distance setting which the system is to furnish, then the image cast onto the first photodetector arrangement F11, F21, F31 finds its counterpart in the image cast onto the third photodetector group F32, F42, F52 of the second photodetector arrangement.

Accordingly, in the illustrated embodiment, each photodetector group within the second photodetector arrangement has the same number of photodetectors, adjoining photodetector groups overlap, and the number of photodetectors involved in the overlap between adjoining photodetector groups is always the same. Of course, some tampering with these relationships would be possible.

The individual photodetectors, as shown in FIG. 2, are connected to inputs of an evaluating circuit 3. Evaluating circuit 3 is connectable to the positive terminal of a camera battery 4 by means of a switch S1. Evaluating circuit 3, in this embodiment, has three outputs A1, A2, A3. A "1" signal appears at output A1 or at output A2 or at output A3, to indicate to the remainder of the system which subject-distance range best corresponds to the measured subject distance. As shown in FIG. 1, output A1 of evaluating circuit 3 is connected to a focus-control electromagnet 109, output A2 to an electromagnet 108, and output A3 to a focus-control electromagnet 107. The armatures 107a, 108a, 109a of these electromagnets 107, 108, 109 are swingable into the path of motion of two successive projections 150, 151 on a focus adjuster ring 152 coupled to the camera objective. Ring 152, when rotated, can cause the camera objective to change in subject-distance setting or, equivalently, when other structure drives the objective per se, the objectives can drive focus adjuster ring 152. Numerals 153, 154, 155 denote springs which bias the armatures 107a, 108a, 109a in a direction attempting to move the armatures into the path of movement of the projections 150, 151. Rigidly mounted on focus adjuster ring 152 is a pin 157 which extends through an elongated arcuate slot 158 in a control disk 159. A spring-drive mechanism 156, here shown as a simple tension spring, drives focus adjuster ring 152 counterclockwise; another spring-drive mechanism 160 drives control disk 159 counterclockwise. A motion-retarding mechanism 161 engages the control disk 159 and, during counterclockwise rotation of the latter, limits the angular speed of the latter to a well-defined and not too swift value.

Numeral 162 denotes a trigger lever biased by a spring 163. When trigger lever 162 is depressed, this closes the start switch S1 for the evaluating circuit 3 and also unlatches control disk 159 so that the latter can begin to be driven counterclockwise. Control disk 159 is provided with camming projections 164, 165, 166, which serve to displace the armatures 107a, 108a, 109a out of the path of movement of the projections 150, 151 of focus adjuster ring 152 when the control disk 159 is turned clockwise after the illustrated mechanism has performed its operations (described below) and is to be reset or recocked, e.g., by a mechanism coupled to the camera's film-transport mechanism.

A control projection 167 on control disk 159 serves to activate a trigger lever 168, by means of which a contact S2 is closed to initiate an automatic exposure-timing operation, and by means of which furthermore an aperture-unblocking blade 169 of the camera's shutter mechanism is unlatched so that it can initiate an exposure by moving from aperture-blocking to aperture-unblocking position. In a manner described below, evaluating circuit 3 ascertains which of the three photodetector groups F12, F22, F32; F22, F32, F42; F32, F42, F52 is in receipt of an image best corresponding to the image cast onto the first photodetector arrangement F11, F21, F31 and, depending upon which photodetector group it is, a "1" signal appears at output A1 or A2 or A3 of evaluating circuit 3. The electromagnets 107, 108, 109 are normally energized, but the appearance of a "1" signal at one of the outputs A1, A2, A3 causes the associated electromagnet to become deenergized, and its armature to fall into the path of movement of one of the two projections 150, 151 on the focus adjuster ring 152.

When trigger lever 162 is depressed and control disk 159 thereby released, both disk 159 and focus adjuster ring 152 are spring-driven counterclockwise at identical angular speed with no relative movement between them. In particular, the motion-retarding mechanism 161 limits the angular speed of control disk 159, and focus adjuster ring 152 cannot turn faster because its pin 157 bears against the leading end of arcuate slot 158. However, when the counterclockwise spring-driven rotation of focus adjuster ring 152 is arrested by one of the armature 107a, 108a, 109a, the pin-and-slot coupling 157, 158 permits the control disk 159 to continue on with its counterclockwise rotation until such time as it reaches its end position.

When control disk 159 reaches its end position, its control projection 167 hits trigger lever 168 causing the latter to swing, and trigger lever 168 closes start switch S2 to initiate an exposure-timing operation and furthermore releases the shutter's aperture-unblocking blade 169 so that an exposure be initiated.

Figure 3:
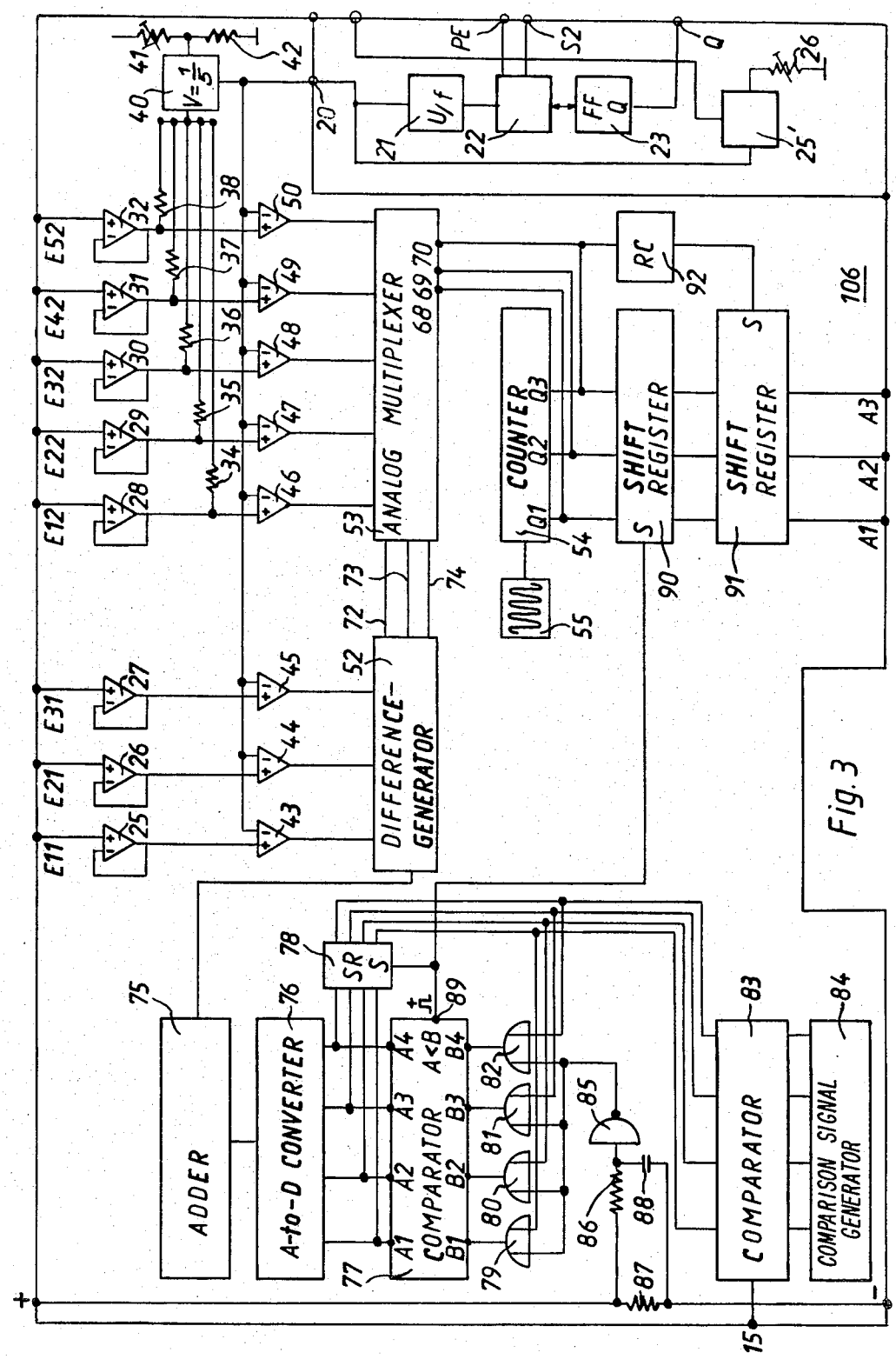
FIGS. 3 and 3a are detailed diagrams of the circuit employed in FIG. 2.

The exposure-duration control or exposure-timing operation is performed by components in sector 106 of FIG. 2, shown in detail in FIG. 3.

The output terminal 20 (see FIGS. 2 and 3) of evaluating circuit 3 is connected to the input of a voltage-to-frequency converter 21, to the output of which is connected the input of a backwards counter 22; counter 22, at the start of a backwards-counting operation, is always preset to a certain count by receipt of a signal at its input PE. The output of counter 22 is connected to the input of a flip-flop 23, in whose output circuit is connected a shutter-control magnet 24. Counter 22 starts counting when start switch S2 closes. Shutter-control magnet 24 is normally energized and, as shown in FIG. 1, normally serves to hold the shutter's aperture-reblocking blade 170 in the aperture-unblocking position; when magnet 24 is deenergized, aperture-reblocking blade 170 can move to aperture-blocking position, thereby terminating an exposure.

Output terminal 20 of evaluating circuit 3 is furthermore connected to the input of a comparator stage 25', whose threshold level is set by means of an adjustable resistor 26. A light-emitting diode 27 (see FIG. 2) connected to the output of comparator stage 25 indicates to the user whether the prevailing scene-light level is or is not sufficient for the making of an acceptable exposure.

FIG. 3 is a detailed circuit diagram of the evaluating circuit 3 of FIG. 2. Its three inputs E11, E21, E31 are each connected to the input of a respective one of three operational amplifiers 25, 26, 27. Likewise, the inputs E12 to E52 of evaluating circuit 3 are each connected to the input of a respective one of six operational amplifiers 28, 29, 30, 31, 32. The operational amplifiers 25 to 32 serve as impedance converters. The output signals of operational amplifiers 28 to 32 are transmitted by respective resistors 34, 35, 36, 37, 38, to the input of an amplifier stage 40, whose gain is set by means of a voltage divider 41, 42, to a value equal to the reciprocal of the number of photodetectors F12 to F52 contained in the second photodetector arrangement. The output signal of amplifier stage 40 is equal to one-fifth the sum of the output signals from the five operational amplifiers 28 to 32, and therefore corresponds to the average of those five output signals. The output signal from amplifier stage 40 is available at external terminal 20 of evaluating circuit 3, as shown. The output of amplifier stage 40 is furthermore connected to the inverting inputs of three operational amplifiers 43, 44, 45, whose non-inverting inputs are connected to the outputs of respective ones of the three operational amplifiers 25, 26, 27. Likewise the output of amplifier stage 40 is connected to the inverting inputs of five operational amplifiers 46, 47, 48, 49, 50, whose non-inverting inputs are connected to the outputs of respective ones of operational amplifiers 28 to 32. Accordingly, the output signals of the operational amplifiers 43 to 45 associated with the first photodetector arrangement are, unlike the output signals of operational amplifiers 25 to 27, referenced to the average value of the output signals from the five photodetectors F12 to F52 of the second photodetector arrangement. Likewise, the output signals of the five operational amplifiers 46 to 50 associated with the second photodetector arrangement are, unlike the output signals of operational amplifiers 28 to 32, referenced to the average value of the output signals furnished by the five photodetectors of the second photodetector arrangement. This affords the advantage that the signals which are now to be processed are substantially independent of the prevailing scene-light level.

The outputs of the operational amplifiers 43 to 45 are connected to a corresponding three inputs of a difference generator stage 52, whose other three inputs are connected to the three outputs of an analog multiplexer 53. The six inputs of analog multiplexer 53 are connected to the outputs of respective ones of operational amplifiers 46 to 50. Analog multiplexer 53 is step-by-step advanced by a counter 54 which is of the so-called Johnson-type, or 1-out-1/n type. In particular the three outputs Q1, Q2, Q3, of Johnson counter 54 are connected to respective control inputs 68, 69, 70 of multiplexer 53. Counter 54, in turn, is step-by-step advanced by clock pulses furnished by a pulse generator 55.

Difference generator stage 52 performs three subtractions at a time. In the first subtraction the output signals from operational amplifiers 43, 44, 45 are subtracted from those of operational amplifiers 46, 47, 48, yielding three difference signals which appear in parallel at the three outputs of stage 52; for the sake of simplicity these three outputs of stage 42 are shown as a single line. These three difference values are generated as absolute magnitudes, i.e. irrespective of the sign of the three differences represented. The second three subtractions performed by difference generator stage 52 involve the subtraction of the output signals from operational amplifiers 43, 44, 45 from the output signals of the second group of operational amplifiers 47, 48, 49; and so forth.

Figure 3A:
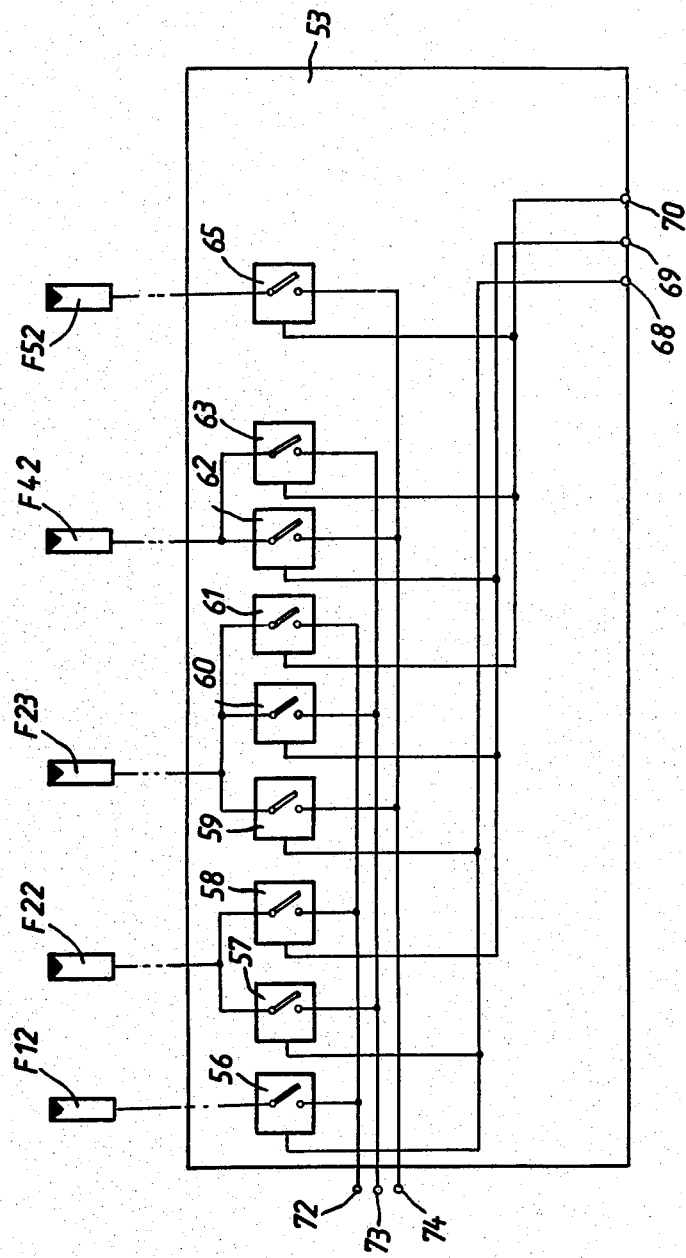

The analog multiplexer 53 of FIG. 3 is shown in detail in FIG. 3a. It comprises electronic switches 56, 57, 58, 59, 60, 61, 62 and 63. The input terminals connected to the Johnson counter 54, namely terminals 68, 69, 70, are expressly shown in FIG. 3a.

The outputs of the electronic switches 56, 58, 61 are connected in common to a first line 72 leading to the difference generator stage 52; the outputs of the electronic switches 57, 60, 63 are connected in common to a line 73 leading to the second input of difference generator stage 52; and the outputs of the electronic switches 59, 62, 65 are connected in common to a line 74 leading to the third input of the difference generator stage 52. Through the intermediary of the various operational amplifiers already discussed, the output of photodetector F12 is connected to the input of electronic switch 56, the output of photodetector F22 to the inputs of electronic switches 57 and 58, the output of photodetector F32 to the inputs of electronic switches 59, 60, 61, the output of photodetector F42 to the inputs of electronic switches 62 and 63, and the output of photodetector F52 to the input of electronic switch 65.

If a "1" signal is applied to the input 68 of analog multiplexer 63, i.e. from output Q1 of Johnson counter 54, then electronic switches 56, 57, 59 are rendered conductive, and the signals from photodetectors F12, F22, F32, through the intermediary of the operational amplifiers already discussed, are transmitted via lines 72, 73, 74 to the three inputs of difference generator stage 52. I.e., the inputs 72, 73, 74 of difference generator stage 52 are now in receipt of the signals from first three-detector group within the second photodetector arrangement. If a "1" signal is applied to multiplexer input 69, then switches 58, 60, 62 become conductive, and the signals from the outputs of the second group of photodetectors F22, F32, F42 are transmitted via lines 72 to 74 to the difference generator stage 52. If a "1" signal is applied to input 70 of multiplexer 53, then switches 61, 63, 65 are rendered conductive, and the signals from the third group photodetectors F32, F42, F52 are transmitted by lines 72 to 74 to the difference generator stage 52.

Thus, returning to FIG. 3, for each of the three successive subtractions just referred to, difference generator stage 52, at its three outputs symbolized by a single line, furnishes the three difference signals involved, in absolute-value form without respect to polarity, to three inputs of an adder stage 75. Adder 75 produces the analog output signal corresponding to the sum of the three absolute-magnitude difference values in question. The output of adder 75 is connected to the input of an analog-to-digital converter 76. Converter 76 converts this analog sum signal into a 4-bit number presented on its four outputs, and this 4-bit number is transmitted to the four inputs A1, A2, A3, A4 of a comparator 77. The four outputs of analog-to-digital converter 76 are furthermore connected to the four inputs of a one-stage shift register or latch-type circuit 78, the four outputs of which are connected to the right inputs of respective ones of four OR-gates 79, 80, 81, 82. The four outputs of one-stage shift register 78 are furthermore connected to a first four inputs of a contrast comparator 83. The second four inputs of contrast comparator 83 receive a 4-bit number from the outputs of a stage 84 furnishing a signal indicative of minimum required contrast.

The left inputs of the four OR-gates 79 to 82 are connected in common to the output of an inverter stage 85, whose input is connected to the output of an inverter stage 85, whose input is connected to the output of an RC stage comprised of two resistors 86, 87 and a capacitor 88. The outputs of the OR-gates 79 to 82 feed into respective ones of the inputs B1, B2, B3, B4 of the comparator 77. Output 89 of comparator 77 produces a "1" pulse if and only if the number represented by the 4-bit signal combination at comparator inputs A1 to A4 is smaller than that represented by the signal combination at inputs B1 to B4.

The output 89 of comparator 77 is connected, first, to the shift or latch input S of the shift register 78 and, second, to the shift input S of a further one-step shift register 90.

The outputs Q1, Q2, Q3 of the Johnson (1-out-of-n) counter 54 feed into respective ones of three inputs of a further one-stage shift register 90, whose corresponding outputs feed into the three inputs of a still further one-stage shift register or latch-type circuit 91. The three outputs of shift register 91 are directly connected to the external terminals A1, A2, A3 of signal evaluating circuit 3. The shift pulse input S of shift register 91 is connected, through the intermediary of an RC timing stage 92, to the output Q3 of Johnson counter 54.

The operation of the evaluating circuit 3 shown in FIG. 3 will now be described.

At the start of the counting cycle of the Johnson counter 54, a "1" signal is applied to input 68 of analog multiplexer 53. As a result, there are transmitted to the three output lines 72, 73, 74 of multiplexer 53 three signals, each corresponding to the difference between a respective one of the three output signals of operational amplifiers 46, 47, 48, on the one hand, and, on the other hand, a signal corresponding to the average of the output signals of all five photodetectors F12 to F52 of the second photodetector arrangement, this average-value signal being furnished from the output of summing amplifier stage 40. These three signals on lines 72, 73, 74, are transmitted to the first inputs of difference generator stage 52. The other three inputs of the difference generator stage 54 receive the output signals from the three operational amplifiers 43, 44, 45. Difference generator stage 52 produces at its three outputs three corresponding absolute-value difference signals, which are transmitted to the three inputs of adder stage 75, algebraically summed therein, and from the output of stage 75 transmitted to the input of analog-to-digital converter 76. The 4-bit number produced by converter 76 is applied to inputs A1, A2, A3, A4 of comparator 77. For the purposes of this first step of operation, a "1" signal is applied via RC-stage 86, 87, 88 and the inverter 85 to the left inputs of all four OR-gates 79, 80, 81, 82, and thereby to the second four inputs B1, B2, B3, B4 of comparator 77. As a result all four of the comparator inputs B1, B2, B3, B4 are in receipt of "1" signals. This assures, for this first step of operation, that the number applied to the B inputs of comparator 77 will exceed the number applied to the A inputs thereof. Consequently, output 89 of comparator 77 produces a "1" pulse, which is applied to the shift input S of shift register or latch-type stage 78, causing the four bits applied to the input of the latter to be registered at the four outputs thereof. This application of "1" signals to all B inputs of comparator 77 occurs only for the first step of operation; soon thereafter, the signal at the output of timing stage 86, 87, 88, changes from "0" to "1", and therefore via inverter 85 the aforementioned "1" signals applied to the left inputs of OR-gates 79, 80, 81, 82 are removed. Now, the four bits at the outputs of stage 78 are transmitted, via the right inputs of OR-gates 79 to 82 to the B inputs of comparator 77. The "1" pulse produced at the output 89 of comparator 77 is, also, transmitted to the shift input S of the one-stage shift register 90. As a result, the "1" signal present at output Q1 of Johnson counter 54 is registered by the corresponding one of the four outputs of stage 90.

This is the end of the first step of operation.

Next, the "1" signal at output Q1 of counter 54 shifts over to output Q2 thereof, and therefore shifts from input 68 to input 69 of analog multiplexer 53. As a result (see FIG. 3a), the output signals from photodetectors F22, F32, F42 are transmitted via lines 72, 73, 74 to difference generator stage 52, and therein subtracted from the signals from photodetectors F11, F21, F31. The absolute-value versions of these three differences are transmitted from the output of stage 52 to the input of adder stage 75, summed therein, and then applied to the input of analog-to-digital converter 76. The 4-bit signal combination produced at the outputs of converter 76 is applied to the four inputs A1, A2, A3, A4 of comparator 77, whereas the inputs B1, B2, B3, B4 thereof continue to be in receipt of the previous 4-bit signal combination. Assume, for the purposes of explanation, that the number applied to the A inputs of comparator 77 is, once again, lower than the number applied to the B inputs thereof. As a result a "1" pulse gain appears at output 89 of comparator 77, causing the four outputs of register 78 now to register this second 4-bit signal combination, which is furthermore transmitted via the right inputs of OR-gates 79 to 82 to the B inputs of comparator 77, replacing the 4-bit signal combination previously applied thereto. This second "1" pulse produced at comparator output 89 is, furthermore, transmitted to the shift input S of one-stage shift register 90, as a result of which the "1" signal presently applied to the second input thereof is registered at the second output thereof.

This concludes the second step of operation.

Next, the "1" signal at output Q2 of counter 54 shifts over the output Q3 thereof. The output signals from photodetectors F32, F42, F52 are now transmitted to difference generator stage 2. The three absolute-value difference signals produced at the three outputs of stage 52 are transmitted to the inputs of adder 75, summed therein, and applied to the input of converter 76. The corresponding 4-bit signals combination produced at the four outputs of converter 76 is now applied to the A inputs of comparator 77, and compared against the number represented by the 4-bit signal combination presently applied to the B inputs thereof. Let it now be assumed, for the purposes of explanation, that the number applied to the A inputs of comparator 77 is greater than the number applied to the B inputs thereof, as a result of which no "1" pulse is produced at comparator output 89. Accordingly, shift register 78 does not register the 4-bit signal combination applied to the inputs thereof, but instead continues to register the 4-bit signal combination previously applied to it. Likewise, therefore, the signal combination applied to the B inputs of comparator 77 is now not supplanted by the new signal combination but instead continues to be held. Furthermore, no "1" pulse is applied to input S of shift register 90, as a result of which stage 90 does not respond to the "1" signal at output Q3 of counter 54, and instead the "1" signal presently registered at the second output of stage 90 continues to be held.

Now, the "1" signal which has appeared at output Q3 of counter 54, after a time delay interval introduced by RC stage 92, is applied to the shift input S of one-stage shift register or latch-type circuit 91. As a result, the "1"

signal presently registered at the second output of stage 90 is now registered at the second output of stage 91, and therefore registered and held at external output A2 of evaluating circuit 3.

The "1" potential at output A2 of evaluating circuit 3 indicates that it is the output signals from the second photodetector group F22, F32, F42 of the second photodetector arrangement F12 to F62 which come the closest to the output signals of the three photodetectors F11, F21, F31 of the first photodetector arrangement. In other words, in this embodiment, the three output signals of the three photodetectors of the first photodetector arrangement are subtracted, in succession, from the three output signals of the first three photodetectors of the five-photodetector second photodetector arrangement, then from the second three photodetectors of the second photodetector arrangement, and then from the third three photodetectors of the second photodetector arrangement, the smallest of the resulting three subtractions being automatically searched out to ascertain which of the three three-detector groups in the second photodetector arrangement best corresponds to the image received by the three photodetectors F11, F21, F31 of the first photodetector arrangement. Furthermore, the smallest of these three successively formed differences is registered and held.

This smallest of the three successively formed differences is now available at the outputs of register 78 and therefore present at the first four inputs of contrast comparator 83. Contrast comparator 83 now ascertains whether this first signal combination represents a number lower or higher than the second signal combination furnished to it from reference signal generator 84. If the first signal combination is lower than that from reference signal generator 84, the potential at output 15 of comparator 83 is at level "1", as a result of which light-emitting diode 14 lights up, to indicate to the user that the contrast exhibited by the image is insufficient.

If more than three subject-distance ranges are to be available, then the system is merely expanded by the addition of further photodetectors for the second photodetector arrangement, with the addition of further associated operational amplifiers and further outputs for the Johnson counter 54 and further inputs for the analog multiplexer 53. The gain of the average-generating amplifier stage 40, however, must then be correspondingly selected.

Figure 4:
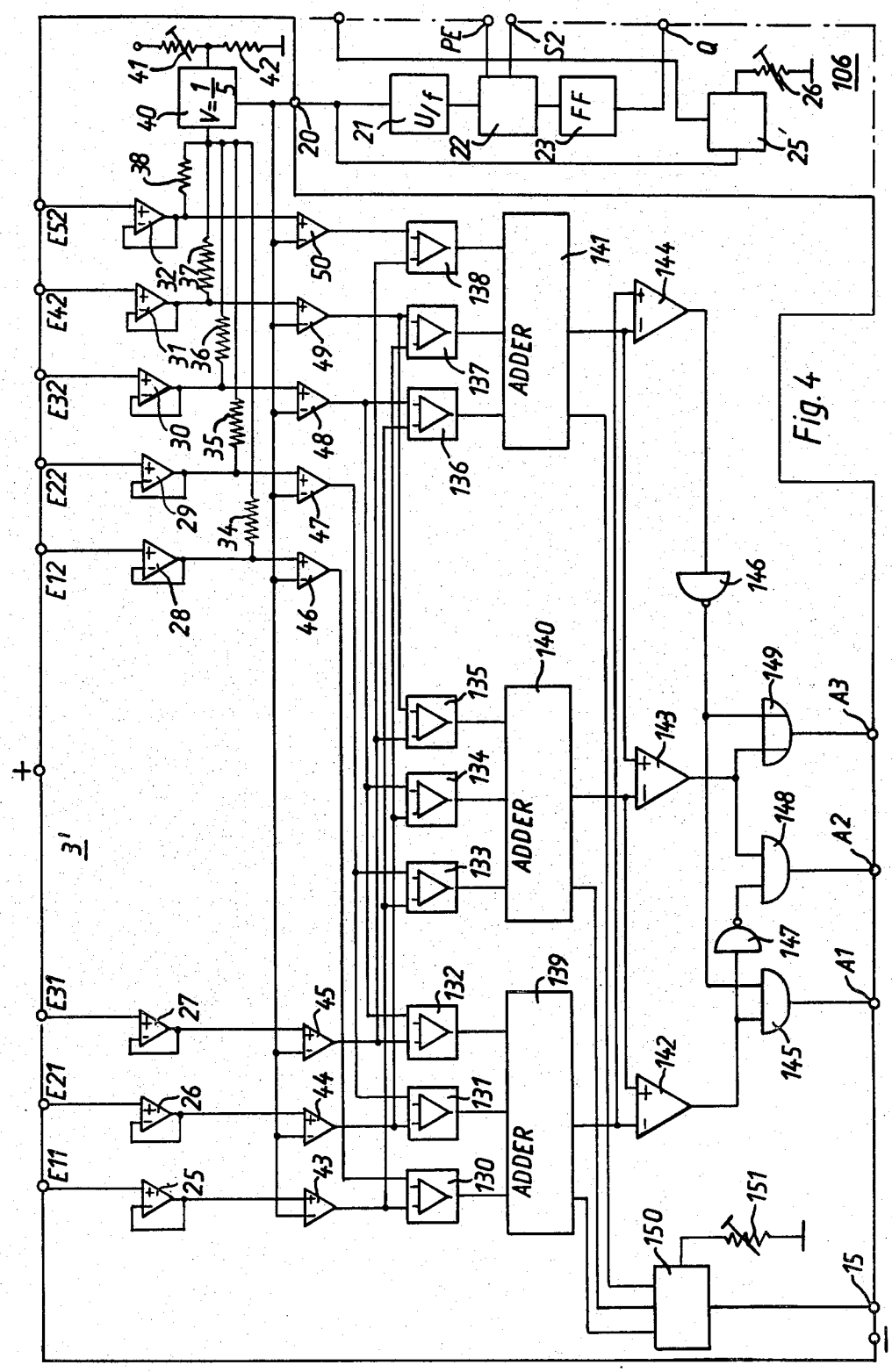
FIG. 4 depicts an alternative circuit for FIG. 3.

FIG. 4 depicts another embodiment of the evaluating circuit 3 of FIG. 3, here denoted 3'. For the sake of simplicity components corresponding to those of FIG. 3 are denoted by the same reference numerals. The output of operational amplifier 43 is connected to the left input of a differential amplifier 130, to whose right input is connected the output of operational amplifier 46. Differential amplifier 130 forms at its output a signal corresponding to the absolute-value version of two quantities, one quantity being the output signal from photodetector F11 minus the average of all the output signals of the five photodetectors F12 to F52 of the second photodetector arrangement, the second quantity being the output signal of the first photodetector F12 of the second photodetector arrangement F12 to F52 minus once more the average of all the output signals of the second photodetector arrangement. A further differential amplifier 131 performs a similar absolute-value subtraction, but of the output signal of operational amplifier 47 associated with the second photodetector F22 of the second photodetector arrangement and of the output signal of the operational amplifier 44 of the second photodetector F21 of the first photodetector arrangement. The next differential amplifier 132 performs such an absolute-value subtraction between the signal at the output of operational amplifier 48 associated with the third photodetector F32 of the second photodetector arrangement and the output signal of the differential amplifier 45 of the third photodetector F31 of the first photodetector arrangement.

A differential amplifier 133 forms the absolute-value difference between the output signal of the operational amplifier 47 associated with second photodetector F22 and the output signal of the operational amplifier 43 associated with the third photodetector F11. A differential amplifier 134 performs such a subtraction between the output signal of operational amplifier 48 associated with the third photodetector F32 and the output signal of the operational amplifier 44 associated with the second photodetector F21. A differential amplifier 135 performs such a subtraction between the output signal of the operational amplifier 59 associated with the fourth photodetector F42 of the second photodetector arrangement and the output signal of operational amplifier 45 associated with the third photodetector F31 of the first photodetector arrangement.

A differential amplifier 136 performs such a subtraction between the output signal of the operational amplifier 48 associated with the third photodetector F32 of the second photodetector arrangement and the output signal of the first photodetector F11 of the first photodetector arrangement. A differential amplifier 137 performs such a subtraction between the output signal of the operational amplifier 49 associated with the fourth photodetector F42 of the second photodetector arrangement and the output signal of the operational amplifier 44 associated with the second photodetector F21 of the first photodetector arrangement. A differential amplifier 138 performs such a subtraction between the output signal of the operational amplifier 50 associated with the fifth photodetector F52 of the second photodetector arrangement and the output signal of the operational amplifier 45 associated with the third photodetector F31 of the first photodetector arrangement.

To repeat, the differential amplifiers 130 to 138 product output difference signals which are absolute-value versions of the differences generated.

A first adder 139 sums the absolute-value difference signals furnished from the differential amplifiers 130, 131, 132. The signal at the output of adder 139 represents the result of the comparison of the signals produced by the photodetectors F11, F21, F31 of the first photodetector arrangement (minus the average of the signals produced by the five photodetectors of the second photodetector arrangement), on the one hand, and, on the other hand, the output signals of the first three photodetectors F12, F22, F32, i.e., the first-group photodetectors, of the second photodetector arrangement (minus the average of the output signals produced by the five photodetectors of the second photodetector arrangement).

The next adder 140 algebraically sums the absolute-value difference signals furnished by the differential amplifiers 133, 134, 135. The output signal produced by adder 140 constitutes the result of the comparison between the output signals of the three photodetectors F11, F21, F31 of the first photodetector arrangement and the output signals of the second three photodetectors F22, F32, F42, i.e., the second-group photodetectors of the second photodetector arrangement, once more referenced to the average of the output signals produced by all photodetectors of the second photodetector arrangement.

The third adder 141 algebraically sums the absolute-value difference signals furnished by the three differential amplifiers 136, 317, 138. The output signal produced by adder 144 represents the result of the comparison between the output signals of the three photodetectors F11, F21, F31 of the first photodetector arrangement and the output signals of the third-group photodetectors F32, F42, F52 of the second photodetector arrangement.

The output of adder 139 is connected to the inverting input of an operational amplifier 142. The output of adder 140 is connected to the inverting input of an operational amplifier 143. The output of the adder 141 is connected to the inverting input of an operational amplifier 144. The non-inverting input of the operational amplifier 142 is connected to the output of adder 140, the non-inverting input of operational amplifier 143 to the output of adder 141, and the non-inverting input of the operational amplifier 144 to the output of adder 139.

The output of operational amplifier 142 is connected to the left input of an AND-gate 145, whose output is connected to the external terminal A1 of the evaluating circuit 3'. The right input of AND-gate 145 is connected, via an inverter 146, to the output of the operational amplifier 144.

The output of the operational amplifier 142 is furthermore connected via an inverter 147 to the left input of a further AND-gate 148, whose output is connected to the external terminal A2 of the evaluating circuit 3'. The right input of AND-gate 148 is connected to the output of operational amplifier 143. The output of operational amplifier 143 is furthermore connected to the left input of an OR-gate 149, whose right input is connected via an inverter 146 to the output of the operational amplifier 144. The output of the OR-gate 149 is connected to the external terminal A3 of the evaluating circuit 3'.

A "1" signal appears at external terminal A1 when two conditions are concurrently met. One condition is that the value of the output signal of adder 139 be smaller than that of the output signal of adder 140, and the other condition is that the value of the output signal of adder 139 be smaller than that of the output signal of adder 141. A "1" signal appears at external terminal A2 when two conditions are concurrently met. One condition is that the potential at the output of adder 140 be smaller than that at the output of adder 139, and the other condition is that the potential at the output of adder 140 be smaller than that of the potential at the output of adder 141.

A "1" signal appears at external terminal A3, when two conditions are concurrently met. One condition is that the potential at the output of adder 141 be smaller than the potential at the output of adder 139, and the other condition is that the potential at the output of adder 141 be smaller than the potential at the output of adder 140.

In other respect the operation of the evaluating circuit 3' shown in FIG. 4 is the same as that of the evaluating circuit 3 shown in FIG. 3. Essentially, the circuit 3' of FIG. 4 performs the plural subtractions required simultaneously whereas that of FIG. 3 performs them sequentially.

For the purposes of contrast-sufficiency indication, the outputs of the adders 139, 140, 141 are connected to the inputs of a comparator 150, whose reference level is set by means of an adjustable resistor 151. The comparator 150 serves, first, to algebraically sum the output signals from the adders 139, 140, 141 and, second, to ascertain whether this sum is greater or smaller than the reference level. If the summed value is smaller than the reference voltage, a "1" signal is produced at external terminal 15. This indicates that the contrast is insufficient. If the contrast is sufficient, a "0" signal is produced at external terminal 15.

Figure 5:
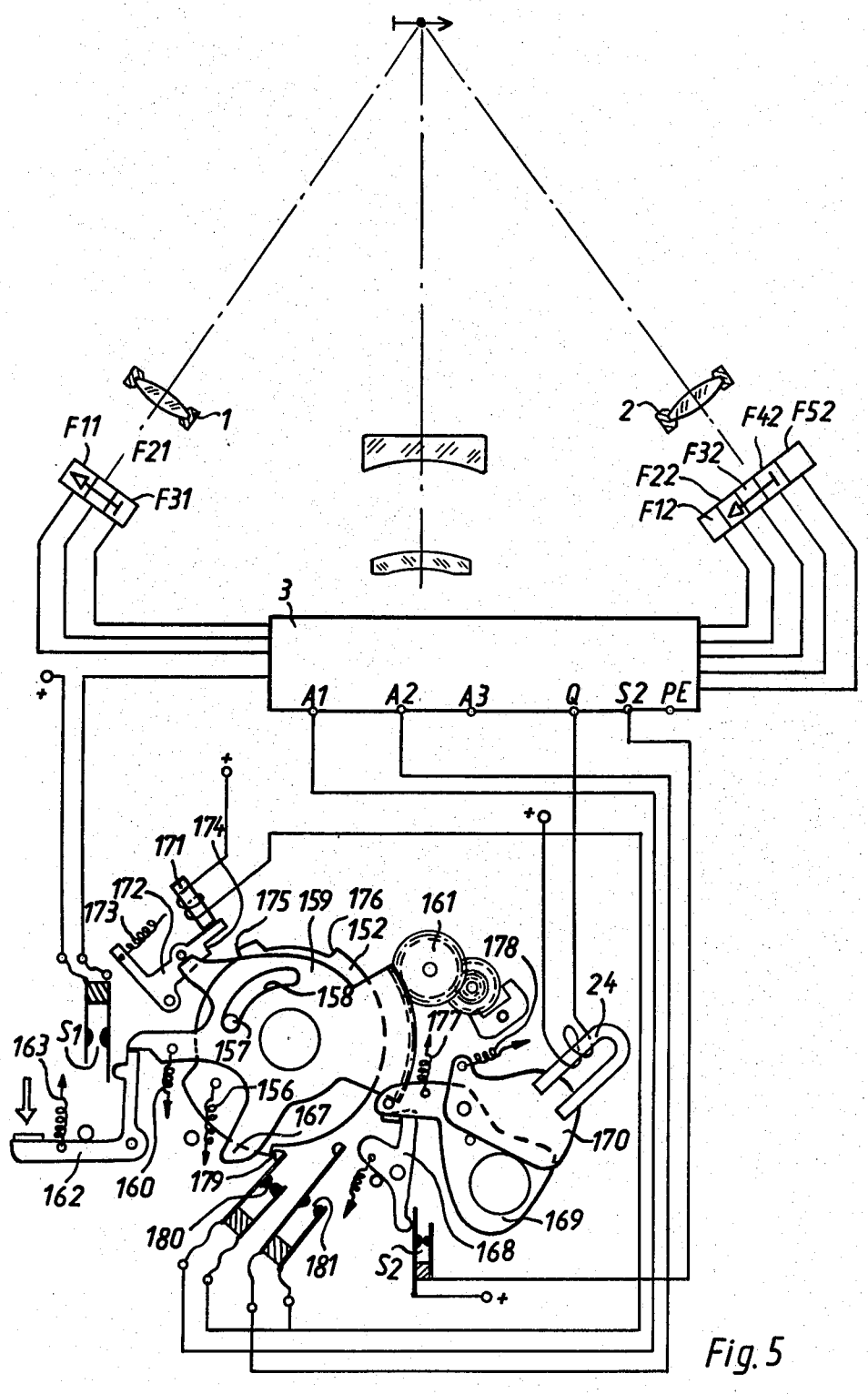
FIGS. 5–8 depict four further exemplary embodiments of the invention.

In the embodiment depicted in FIG. 5, components corresponding to those in the embodiment of FIG. 1 are denoted by the same reference numerals. Here, instead of a plurality of focus-control electromagnets, only a single such electromagnet is employed. Furthermore, only two subject-distance settings are made available in this embodiment, so that output A3 of evaluating circuit 3 can be left unused.

The single focus-control electromagnet employed is denoted by numeral 171. Its armature 172 is biased by a spring 173 in a direction tending to keep a projection 174 on the armature 172 out of the path of movement of two projections provided on the focus adjuster ring 152.

The shutter's aperture-unblocking blade 169 is biased by a spring 177, whereas its aperture-reblocking blade 170 is biased by a spring 178.

Focus adjuster ring 152 is provided with a further projection 179, in whose path of travel are located two position-sensing switches 180 and 181, located one after the other. The two right contacts of these position-sensing switches 181, 182 are connected in common to one terminal of focus-control electromagnet 171, the other terminal of which is connected to the positive terminal of the camera battery. The left contacts of the two switches 181, 182 are connected to respective ones of the outputs A1 and A2 of the evaluating circuit 3.

If the image cast onto the first photodetector arrangement F11, F21, F31 finds its closest counterpart in the image cast onto the second photodetector group F22, F32, F42 within the second photodetector arrangement F22 to F52, then as already explained a "1" signal appears at output A2 of evaluating circuit 3. During the retarded counterclockwise turning of focus adjuster ring 152, when the latter reaches the angular position corresponding to this second subject-distance setting, the projection 179 thereon closes second position-sensing switch 181, as a result of which the voltage level "1" present at evaluating-circuit output A2 is transmitted to the electromagnet 171, deenergizing the latter. As a result, its armature 172 drops down, and the projection 174 thereon moves into the path of, and stops, the projection 176 on the focus adjuster ring 152; accordingly, focus adjuster ring 152 is now arrested at a position in which the camera objective has in fact been adjusted to the second subject-distance setting, i.e., corresponding to output A2.

Figure 6:
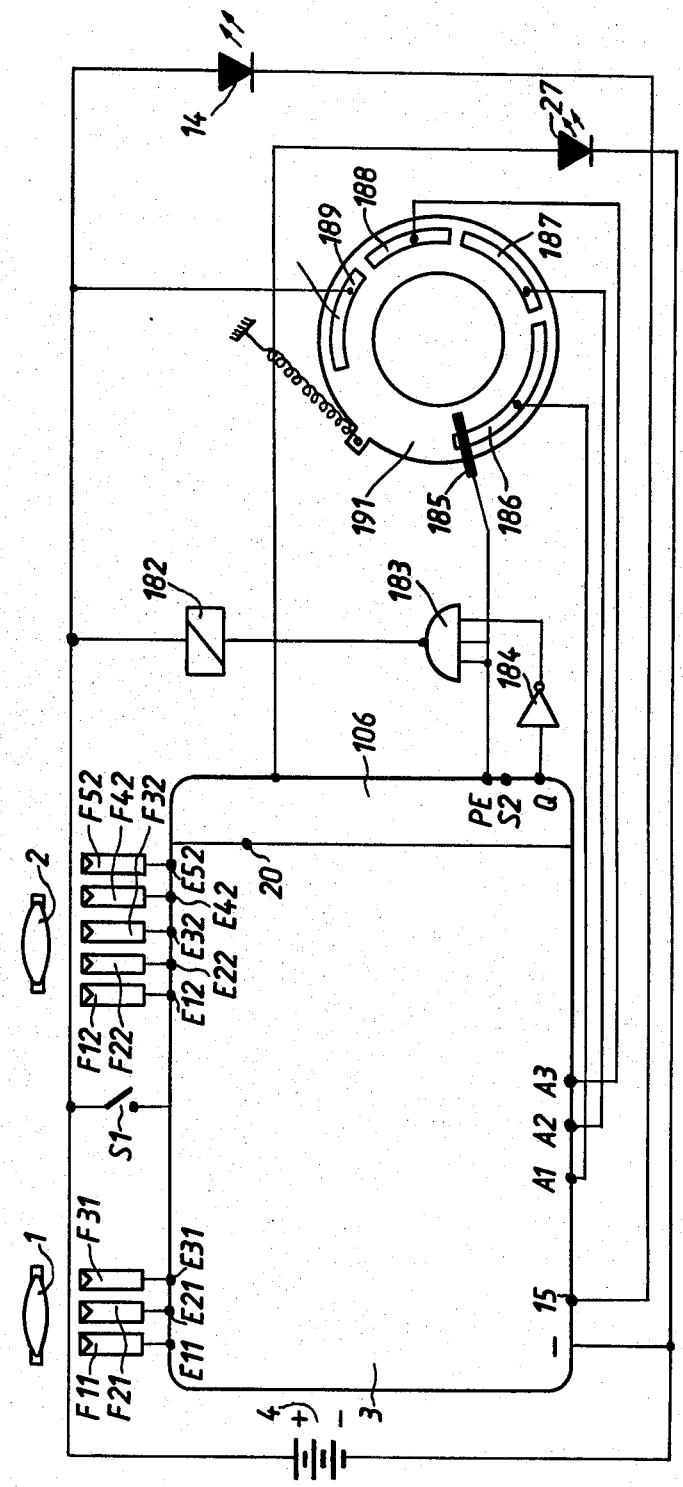
Figure 7:
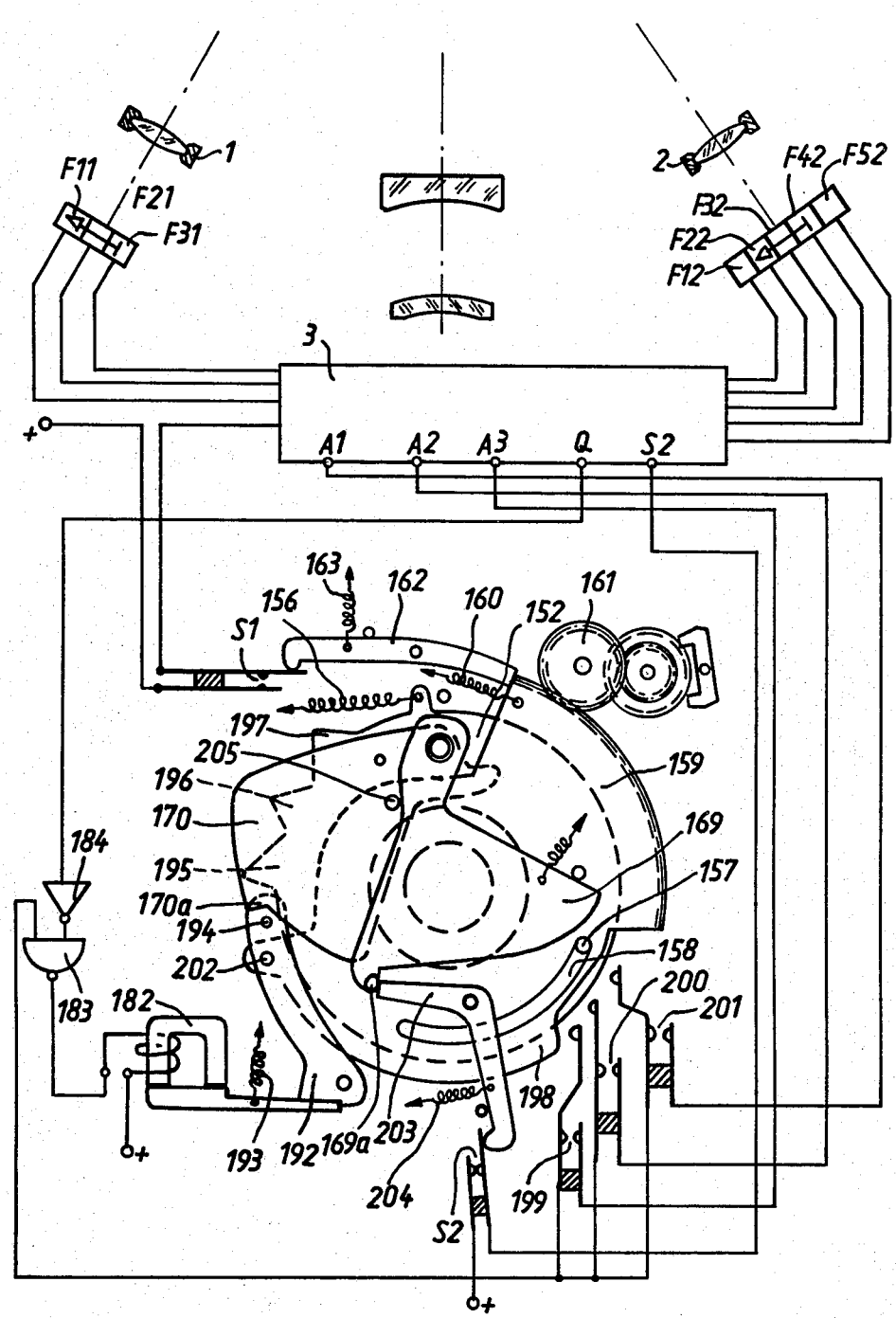

FIGS. 6 and 7 depict two further embodiments of the present invention, in both of which only a single focus-control electromagnet is employed, and in which furthermore such single focus-control electromagnet is additionally employed to terminate the exposure at an instant automatically selected by a light-responsive timing circuit. In FIG. 6, mechanical components shown in detail in FIG. 7 are omitted and will be described subsequently with respect to FIG. 7; however FIG. 6 is described first.

In FIG. 6, components corresponding to those of FIG. 2 are denoted by the same reference numerals as therein. The single electromagnet used both to establish the correct subject-distance setting and also to terminate the exposure, is denoted by numeral 182. Electromagnet 182 has its upper terminal connected to the positive terminal of battery 4, and its lower terminal connected to the output of a NAND-gate 183. The left two inputs of NAND-gate 183 are connected to a stationary contact wiper 185, which latter is also electrically connected to input terminal PE of exposure-duration control circuit 106; as shown in FIG. 3, and as already described, a "1" signal applied to terminal PE (FIG. 6) resets backwards counter 22 (FIG. 4) to its predetermined initial count. The right input of NAND-gate 183 is connected to output terminal Q of exposure-duration control stage 160, via an inverter 183; as shown in FIG. 3, output Q is connected to the output of a flip-flop 23, in turn connected to the backwards counter 22 of the exposure-duration control circuitry.

The aforementioned stationary wiper contact 185 successively engages three successive arcuate contact strips 186, 187, 188 provided on focus adjuster ring 191. A fourth such contact strip is denoted by numeral 189. Contact strip 186 is connected to evaluating-circuit output A1, 187 to A2, and 188 to A3; contact strip 189 is electrically connected to the position terminal of battery 4. Depending on the identification of the best subject distance setting by the evaluation circuit 3, one of the outputs A1 through A3 produces a "1" signal which is applied to the corresponding contact strip of the ring 191. Thereafter, when the latter contact strip is swept by the wiper contact 185, the "1" signal is applied both to NAND-gate 183 and to the start input terminal PE of the circuit 106. As a consequence, the exposure duration control circuit 106 will start not only after the control cam disk 159 (FIG. 5) has attained its end position, but also when the subject-distance detector identifies the desired focus setting.

The output Q of the exposure control stage 106 furnishes a "0" signal until the moment when an exposure in progress is to be terminated, whereupon a "1" signal is produced; accordingly the same comment applies to the "1" signal furnished at the output of inverter 184 to the right input of NAND-gate 183. The operation of this embodiment will become clearer from the detailed description of the similar embodiment depicted in FIG. 7. Briefly, however, it is noted that in FIG. 6, the electromagnet 182 is normally unenergized; first, the focus adjuster ring 191 is rotated through successive subject-distance settings, i.e., with electromagnet 182 in an unenergized state, until the setting corresponding to the one of the three evaluating-circuit outputs A1, A2, A3 carrying the "1" signal is reached, whereupon a "1" signal is applied to the left two inputs of NAND-gate 183, producing a "0" signal at the output of the latter 183, thereby energizing electromagnet 182 and causing focus adjuster ring 191 to be arrested in the subject-distance setting just reached; when the scene-light-dependent exposure interval selected by the system has elapsed, the "1" signal at the Q output of exposure circuit 106 causes electromagnet 182 to become deenergized again, and the exposure is terminated. If it is the A1 output of evaluating circuit 3 which carries the "1" signal, i.e., the first input, then adjuster ring 191 is immediately arrested, and the exposure begins; if none of outputs A1, A2, A3 carries a "1" signal, then the focus adjuster ring continues to turn all the way to its end position, corresponding to infinity subject distance, and when the last contact strip 189 reaches wiper 185 a "1" signal is applied to input PE, thereby initiating an exposure, in the same sense as just referred to.

The foregoing will become clearer from a consideration of FIG. 7, which is an embodiment corresponding to FIG. 6 but with the three contact strips 186, 187, 188 of FIG. 6 here replaced by three stationary position-sensing switches 199, 200, 201. Components in FIG. 7 corresponding to those of FIGS. 1 and 5 are denoted by the same reference numerals as used therein.

The electromagnet 182 of FIG. 7, serving both for focus control and exposure control, has an armature 192 biased by a spring 193 towards the electromagnet 182, i.e., biased in the same direction as the electromagnet 182 pulls armature 192 when electromagnet 182 is energized.

The free end of armature 192 carries a pin 194 located in the path of movement of three successive projections 195, 196, 197 on the focus adjuster ring 152. The pin 194 is also located in the path of movement of an edge 170a on the aperture-reblocking blade 170 of the camera's shutter mechanism.

A projection 198 on control disk 159 successively closes three position-sensing switches 199, 200, 201, i.e., in the same manner as explained with respect to the two position-sensing switches 180, 181 of FIG. 5 engaged by the projection 167 of control disk 159 in FIG. 5. The right contacts of these three position-sensing switches 199, 200, 201 are connected to respective ones of the three outputs A1, A2, A3 of the evaluating circuit 3. The left contacts of the switches 199, 200, 201 are connected in common to the left input of the NAND-gate 183 shown in FIG. 7.

The embodiment depicted in FIG. 7 operates as follows:

Before any of the moving components in FIG. 7 commence to move, they occupy the positions illustrated. The left input of NAND-gate 183 is in receipt of a "0" signal, and therefore its output signal is a "1" signal irrespective of the signal received at its right input; i.e., the "0" signal at the left input of NAND-gate 183 keeps the AND-gate disabled and unresponsive to changes in the signal at its right input. However, it is to be noted that the signal at the right input of NAND-gate 183 is at this point a "1" signal, because evaluating circuit output Q furnishes a "0" signal except at the end of an exposure-timing operation. With the "1" signal from the output of NAND-gate 183 applied to electromagnet 182, the latter is unenergized. Also, as shown, exposure-initiation switch S2 is closed, preventing initiation of an exposure-timing operation.

To start operation, trigger lever 162 is depressed. As a result, the right end of trigger lever 162 releases the edge of control disk 159, and the latter commences to turn counterclockwise, under the action of drive-spring mechanism 160. The speed with which control disk 159 thusly turns counterclockwise is limited by the motion-retarding mechanism 161. After control disk 159 has just begun to turn counterclockwise in this way, its periphery slips under the right end of trigger lever 162, keeping the latter in triggered condition and therefore keeping switch S1 closed, so that the evaluating circuit 3 can operate.

Before this release of control disk 159, spring-drive mechanism 156 was already attempting to pull focus adjuster ring 152 counterclockwise, but the pin 157 on adjuster ring 152 was at the leading end of the arcuate slot 158 in control disk 158, so that until the release of control disk 159 focus adjuster ring 152, likewise, was not able to turn counterclockwise.

Accordingly, when trigger lever 162 is depressed, both the control disk 159 and the focus adjuster ring 152 commence to turn counterclockwise. Adjuster ring 152 turns at an angular velocity identical to that of control disk 159, namely a speed determined by motion-retarding mechanism 161, because the pin 157 on focus adjuster ring 152 continues to be located at the leading end of slot 158 of control disk 159, preventing ring 152 from turning counterclockwise any faster than does control disk 159.

Let it be assumed that of evaluating-circuit outputs A1, A2, A3, it is output A2 which produces a "1" signal in response to the closing of switch S1.

The in-unison rotating control disk 159 and focus adjuster ring 152 rotate a first distance, until projection 198 on control disk 159 closes position-sensing switch 199, this not resulting in energization of magnet 182 because no "1" signal is present at evaluating circuit A1. At the same time that projection 198 on control disk 159 reaches and closes switch 199, the first projection 195 on focus adjuster ring 152 reaches the pin 194 on the free end of the armature 192 of electromagnet 182. Because electromagnet 182 is still in an unenergized condition, projection 195 pushes pin 194 and armature 192 away, i.e., out of the path of motion of projection 195 and against the action of biasing spring 192, so that projection 195 gets past pin 194. As a result, focus adjuster ring 152 can continue to turn in company with control disk 159 through a further second distance.

Focus adjuster ring 152 and control disk 159 now turn this further distance in each other's company, until projection 198 on disk 150 closes switch 200. In response to the latter, a "1" signal is transmitted from evaluating-circuit output A2 to the left input of NAND-gate 183. As already stated, the right input of NAND-gate 183 is in receipt of a "1" signal except when an exposure is to be terminated. Accordingly, NAND-gate 183 now produces a "0" signal, thereby causing electromagnet 182 to become energized. As the control disk 159 closes switch 200 in this way, the second projection 196 on focus adjuster ring 152 reaches the pin 194 at the free end of the armature 192 of electromagnet 182. However, now electromagnet 182 is in energized state, and this second projection 196 on focus adjuster ring 152 is therefore unable to push armature 192 away. Accordingly, the focus adjuster ring 152 is now arrested in its second subject-distance setting, in correspondence to the "1" signal at evaluating-circuit output A2.

Focus adjuster ring 152 turns no further, and the automatic focussing operation is entirely complete.

In contrast, due to the pin-and-slot coupling 157, 158, control disk 159 is free to continue turning counterclockwise, and does so.

Control disk 159 turns counterclockwise all the way to its end position, at which a pin 202 carried on control disk 159 hits against a trigger lever 203 displacing the latter counterclockwise against the force of a biasing spring 204. This causes the left end of trigger lever 203 to unblock a pin 169a carried on the aperture-unblocking blade 169 of the camera's shutter mechanism, and a conventional drive spring pulls the aperture-unblocking blade 169 from aperture-blocking to aperture-unblocking exposure, thereby initiating an exposure.

Simultaneously therewith, the lower end of trigger lever 203 permits exposure-initiation switch S2 to open and the light-dependent exposure-timing operation to commence.

Before this release of aperture-unblocking blade 169, the left edge of the latter was pressed against by a pin 205 carried on the aperture-reblocking blade 170 of the shutter mechanism, i.e., thereby keeping reblocking blade 170 in its initial or aperture-unblocking position. Now, however, with aperture-unblocking blade 169 released, aperture-reblocking blade 170 commences to turn counterclockwise, a very short distance not resulting in entry into the exposure-light path of the camera. In particular, before aperture-reblocking blade 170 can actually enter the exposure-light path of the camera, the edge 170a of blade 170 is stopped against the pin 194 of the armature 192 of electromagnet 182. Electromagnet 182 is still in energized state, so that edge 170a cannot push armature 192 away; accordingly, at this point in the operation of the system, both the second projection 192 on focus adjuster ring 152 and also the edge 170a of aperture-reblocking blade 170 are stopped against pin 194, and the exposure is allowed to continue.

When exposure-timing counter 32 (FIG. 3) has counted down to zero, at a rate dependent upon the scene-light-level signal furnished by voltage-to-frequency converter 21, evaluating-circuit output Q now, for the first time, produces a "1" signal. As a result, a "0" signal is applied to the right input of NAND-gate 183 in FIG. 7, and the output signal of gate 183 changes from "0" to "1", thereby rendering electromagnet 182 once more unenergized.

With electromagnet 182 now again in unenergized state, both the edge 170a of aperture-reblocking blade 170 and the second projection 196 focus adjuster ring 152 cooperate to push pin 194 and armature 192 away, i.e., so that focus adjuster ring 152 can resume its earlier interrupted counterclockwise turning action and so that aperture-reblocking blade 170 can be swiftly pulled closed, by means of a non-illustrated spring. Aperture-reblocking blade 170 moves into aperture-blocking position, thereby terminating the exposure, before the focus adjuster ring 152 has an opportunity to turn further by more than any negligible distance.

Accordingly, in the embodiment depicted in FIG. 7, and likewise the similar one depicted in FIG. 6, an automatic focussing operation is performed first, followed by exposure initiation, an automatic exposure-timing operation, and then exposure termination, with one and the same electromagnet 182 being used both to establish the subject-distance setting required and, thereafter, to terminate the exposure.

Figure 8:
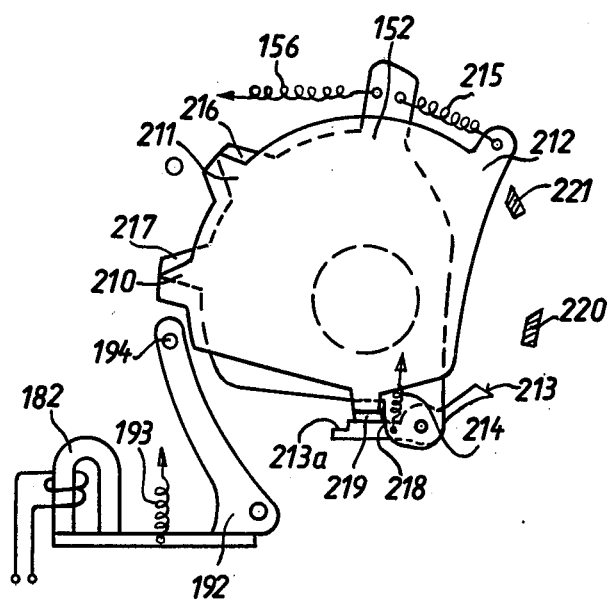

FIG. 8 depicts an accessory attachment, which can be added to the type of mechanism shown in FIG. 7, to introduce a still further aspect of control, namely diaphragm-aperture size control. Moreover, control of diaphragm-aperture size can be achieved using, once more, the self-same single electromagnet 182, i.e., so that the latter serve first to establish the requisite subject-distance setting, serve thereafter to establish the correct diaphragm-aperture size, and serve finally to terminate the exposure.

Use of the accessory attachment shown in FIG. 8, i.e., in combination with the type of mechanism shown in FIG. 7, requires certain modifications of the mechanism shown in FIG. 7. One modification relates to energization of electromagnet 182. In FIG. 7, electromagnet 182 becomes energized for the first time when the projection 198 on control disk 159 closes that one of switches 199, 200, 201 associated with the one of evaluating-circuit outputs A1, A2, A3 carrying the "1" signal; and after that switch has been closed, e.g., switch 200, magnet 182 continues to be energized, even for example when projection 198 on disk 159 subsequently reaches last switch 201, until the time for exposure termination is reached. For use of the accessory attachment shown in FIG. 8, when the position-sensing switch associated with the "1" signal is reached, then just as described before electromagnet 182 is energized to cause the requisite subject-distance setting to be established; after this is done, however, and unlike the explanation made above with respect to FIG. 7, the electromagnet 182 is allowed to go deenergized, so that it can be energized a second time to establish the requisite diaphragm-aperture size, and then it stays energized until the exposure is ready to be terminated. Such briefer first energization of electromagnet 182 can, for example, be implemented by simply making the projection 198 on control disk 159 (FIG. 7) of shorter circumferential length, so that only one of switches 199, 200, 201 is every closed at any given time or, very simpley, by using the contact strip technique of FIG. 6 in lieu of the stationary switches 199–201 of FIG. 7.

In FIG. 8, components corresponding to those in FIG. 7 are denoted by the same reference numerals as in FIG. 7.

In particular, numeral 152 once more denotes the focus adjuster ring of the mechanism, although in FIG. 8 such ring is provided with only two projections 210, 211.

A control disk such as the control disks 159 shown in FIGS. 1, 5 and 7 is provided, and is coupled to the focus adjuster ring 152 using a pin-and-slot coupling such as the coupling 157, 158 already described. To avoid crowding, such control disk is not shown in FIG. 8.

In FIG. 8, the focus adjuster ring 152 is provided with a switching disk 212. Both ring 152 and switching disk 212 are mounted for rotation about an identical rotation axis, the same one as shared by the (here non-illustrated) control disk.

A two-armed latching lever 213 is pivoted on a pivot pin carried on focus adjuster ring 152, the pivot axis of latching lever 213 being located spaced from the rotation axis of adjuster ring 152. A biasing spring 214 attempts to turn two-armed latching lever 213 clockwise, i.e., clockwise relative to the focus adjuster ring 152 on the latching lever 213 is mounted.

A tension spring 215 has its left end connected to focus adjuster ring 152, and its right end connected to switching disk 212. Tension spring 215 attempts to pull switching disk 212 along, when focus adjuster ring 152 is turning clockwise.

The lower end of switching disk 212 (i.e., in the position thereof shown in FIG. 8) is provided with a bent tab 219. Tab 219 extends parallel to the rotation axes of the rotating components, i.e., perpendicularly out of the plane of illustration in FIG. 8 and towards the viewer of FIG. 8.

Normally, for example in the position actually shown in FIG. 8, the right side of bent-forwards tab 219 presses against an edge 218 of focus adjuster ring 152. Thus, in the position shown in FIG. 8 (with focus adjuster ring 152 locked in place by means of a control disk and trigger lever such as shown at 149 and 162 in FIG. 7), tension spring 215 attempts to pull switching disk 212 counterclockwise, i.e., counterclockwise relative to the presently immovable focus adjuster ring 152, but cannot actually do so, because tab 219 bears against edge 218.

I.e., counterclockwise movement of the switching disk 212 relative to the stationary focus adjuster ring 152 is prevented by the abutment of the right edge of tab 219 against edge 218 of focus adjuster ring 152. In contrast, and as will become clearer below, counterclockwise movement of focus adjuster ring 152 relative to the switching disk 212 (when the latter is held stationary) is not at all prevented by this cooperation between tab 219 and edge 218.

Switching disk 212 is provided with two projections 216 and 217. The leading edges of these projections (i.e., leading when ring 152 and disk 212 are turning counterclockwise) lead the leading edges of the projections 210, 211 of focus adjuster ring 152.

Also, two-armed latching lever 213 has, at the end of its left arm (as viewed in FIG. 8), a notch edge 213a.

It is emphasized again that the mechanism shown in FIG. 8 is used in conjunction with a mechanism of the type shown in FIG. 7.

The mechanism shown in FIG. 8 operates as follows:

A trigger lever (such as 162 in FIG. 7) is depressed, thereby releasing a control disk (such as 159 in FIG. 7), and such control disk, retarded by a motion-retarding mechanism (such as 161 in FIG. 7), commences to turn counterclockwise, focus adjuster ring 152 simultaneously commencing to turn counterclockwise, and in unison with the control disk due to the pin-and-slot coupling employed (such as 157, 158 of FIG. 7).

As already stated, switching disk 212 cannot turn counterclockwise ahead of focus adjuster ring 152, i.e., cannot lead the latter, although focus adjuster ring 152 can turn counterclockwise ahead of switching disk 212, i.e., can lead the latter.

Accordingly, when the trigger lever (such as 162 in FIG. 7) is depressed, and the control disk (such as 159 in FIG. 7) and the focus adjuster ring 152 begin to turn counterclockwise in unison, switching disk 212 simultaneously begins to turn counterclockwise in exact unison with focus adjuster ring 152.

First, the requisite subject-distance setting is to be established.

In this embodiment, only two subject-distance settings are employed, although merely by way of example. Assume, for the purposes of explanation that it is the second subject-distance setting which is needed, i.e., that it is evaluating circuit output A2 which carries the "1" signal.

Electromagnet 182 is initially unenergized, just as already described with respect to FIG. 7 wherein likewise the second subject-distance setting was needed.

With electromagnet 182 unenergized, the first projection 217 on switching disk 212 pushes armature 192 away, so that both projection 217 and the first projection 210 on focus adjuster ring 152 can push past pin 194, all three elements (i.e., the non-illustrated control disk, the focus adjuster ring, and the switching disk) turning counterclockwise in unison. Spring 193 can be relatively weak; its purpose is mainly to bring armature 192 towards electromagnet 182 whenever possible, so that the magnetic attracting force of electromagnet 182 need be used for holding purposes only, and not motion-generating purposes, and therefore be kept low.

Now, when focus adjuster ring 152 and switching disk 212 have turned further, so that their second projections 211, 216 are nearing pin 194, electromagnet 182 becomes energized, in substantially the same way as in FIG. 7, i.e., using position-sensing switches, for example of the type shown in FIG. 6, i.e., with only one position-sensing switch at a time being in closed state.

The leading edge of the second projection 216 on switching disk 212 reaches pin 194 before the leading edge of the second projection 211 on focus adjuster ring 152. Because electromagnet 182 is now in energized state, switching-disk projection 216 cannot push past pin 194, and switch disk 212 is now arrested against further counterclockwise turning movement.

However, focus adjuster ring 152 is free to turn counterclockwise a further small distance, namely until the leading edge of its second projection 211 hits against pin 194, and ring 152 does so. I.e., ring 152 commences to move counterclockwise relative to the now stationary switching disk 212.

During this interval of relative movement, two-armed latching lever 213, carried on the still turning adjuster ring 152, moves rightwards relative to the presently stationary tab 219 on presently stationary switching disk 212, begins to move rightwards relative to stationary tab 219, until the notched edge 213a at the left end of lever 213 reaches the right edge of tab 219, whereupon spring 214 snaps the notched edge 213a up into engagement with the right edge of tab 219. I.e., two-armed latching lever 213 is pulled by spring 214 a very small distance clockwise, relative to the pivot pin of two-armed latching lever 213. As a result, the right arm of two-armed latching lever 213 extends radially outward, i.e., from the rotation axis of focus adjuster ring 152, a slightly greater distance then before, now into the way of a second stop member 221, associated with the second subject-distance setting. The right end of lever 213 did not hit against a first stop member 220, associated with the first subject-distance setting, because the action just described has not yet occurred.

At this stage of the operation, latching lever 213 is located intermediate the first stop member 220 and the second stop member 221, and as just stated is now located in the way of second stop member 221. At this stage of operation, however, both the switching disk 212 and the focus adjuster ring 152 continue to be arrested against further turning movement by the pin 194 on the armature of the presently energized electromagnet 182.

However, whereas focus adjuster ring 152 has now come to a stop (not yet in the second-subject-distance setting), the non-illustrated control disk is, as in all the other embodiments illustrated, still free to continue turning counterclockwise, and does so.

Now, in the manner of FIG. 7, the switch-activating projection on said control disk (such as 198 on 159 in FIG. 7) clears the position-sensing switch associated with the required subject-distance setting (the second such switch in this instance), and for the purposes of FIG. 8 such switch is allowed to snap open again, resulting in a return of electromagnet 182 to its unenergized state.

With electromagnet 182 once more in unenergized state, the second projections 211, 216 on adjuster ring 152 and switching disk 212 can now push past pin 194, and do so, and both ring 152 and disk 212 resume their counterclockwise turning movement, once more travelling in unison although now with relative positions different from the initial relative positions shown in FIG. 8, until the right end of two-armed latching lever 213 on adjuster ring 152 hits against the second-subject-distance stop member 221, whereupon both ring 152 and switching disk 212 come to a halt.

Focus adjuster ring 152 has now been arrested in the second-subject-distance setting thereof, and the automatic focusing operation is entirely complete.

The non-illustrated control disk, however, as in the other embodiments illustrated, has to turn counterclockwise a considerable further distance before it actually triggers an exposure initiation and the initiation of an exposure-timing operation. Accordingly, at this point of operation, the exposure is yet to be initiated.

With the exposure per set yet to be initiated, and most importantly, with electromagnet 182 once more in its unenergized state, electromagnet 182 is now available or free to perform another such position-determining operation, upon some further mechanism, i.e., in substantially the same way that it determined the setting of the focus adjuster ring in all embodiments illustrated.

Thus, for example, such further mechanism can be a mechanism for automatically setting the requisite diaphragm-aperture size in dependence upon sensed scene-light level. Furthermore, such further mechanism can be of substant-ally exactly the same type hereinabove described for establishing he requisite subject-distance setting, i.e., with an aperture-size adjuster ring corresponding to the focus adjuster ring of the illustrated embodiments, with such aperture-size adjuster ring having plural projections which push past or are stopped by the pin 194, with such aperture-size adjuster ring having switch-activating projections activating a succession of position-sensing switches which sense the position of the aperture-size adjuster ring, and with such position-sensing switches being connected to respective outputs of a digital circuit producing signals indicative of the requisite aperture-size setting. Of course, circuits producing signals indicative of a required aperture size are in themselves extremely elementary in the art, and for purposes of similarity to the 1-out-of-n signal code used at the outputs A1, A2, A3 of the illustrated subject-distance-evaluating circuit 3 shown herein, it is merely necessary to apply such a conventional required-aperture-size signal to an analog-to-digital converter, and from there to a 1-out-of-n decoder, by way of example.

If it is desired to entirely complete the automatic focussing operation before even initiating the motions of the aperture-size control mechanis, this can be simply done by providing the control disk with a projection which hits against a latch (such as latch 103 in FIG. 7), but with the latch serving to prevent the start of counterclockwise turning of such aperture-size adjuster ring until after the control disk has reached an angular position certain to be subsequent to automatic-focussing completion. Then, after the aperture-size adjustment has been completed, the control disk, in the same manner as described with respect to the other embodiments, continues to travel on to its end position, at which its hits against the trigger lever for the shutter mechanism to initiate the exposure per se and, directly or indirectly, activates the start switch for the exposure-duration control circuit of the camera.

It will be understood that each of the elements described above, or two or more together, may also find a useful application in other types of constructions differing from the types described above.

While the invention has been illustrated and described as embodiment in a photographic camera, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An automatic exposure control for an automatic-focus photographic camera, comprising
   an adjustable objective successively adjustable to a number of different subject-distance settings;
   an objective adjuster movable to a like number of positions, each position corresponding to a one of the subject-distance settings of the objective;
   a control structure movable together with the objective adjuster through said like number of positions;
   a subject-distance detector automatically identifying which of the subject-distance settings best corresponds to a distance to a subject being photographed, the subject-distance detector including:
   (a) a first photodetector array fixed to the camera and including a first plurality of adjoining photodetectors,
   (b) a second photodetector array fixed to the camera and including a second plurality of adjoining photodetectors, the second plurality exceeding the first plurality by a number dependent upon the number of different subject-distance settings of the objective,
   (c) first optical means fixed to the camera and operative for projecting an image of a subject onto the first photodetector array in such a manner as to prevent any substantial shift between such projected image and the photodetectors in the first photodetector array for any subject-distance settings to which the objective may be adjusted,
   (d) second optical means fixed to the camera and operative for projecting another image of said subject onto the second photodetector array in such a manner as to induce a shift between the projected image and the photodetectors of the second photodetector array with such shift being dependent upon that one of the subject-distance settings which corresponds to objective distance to said subject,
   (e) a signal-evaluating circuit connected to all photodetectors in the first and second photodetector arrays in such a manner as to divide the photodetectors in the second photodetector array into a successive plurality of groups, each such group including a like number of adjoining photodetectors and overlapping an adjoining group by a like number of photodetectors, whereby each such group corresponds to a respective one of the subject-distance settings of the objective,
   the signal-evaluating circuit furthermore including a comparator and a comparison evaluator, the comparator performing a plurality of comparisons, in which plurality each comparison compares output signals produced by the photodetectors of the first photodetector array with output signals produced by the photodetectors in a corresponding group of photodetectors in the second photodetector groups and the comparison evaluator selecting that one of the comparisons in which such output signals best approximate each other, said comparison evaluator having as many outputs as many successive groups are present in the second photodetector array, whereby a group corresponding to a best subject-distance setting of the objective is identified by a signal at one of said outputs;
   a spring-powered drive and arrest mechanism including a plurality of like electromagnets connected to said outputs, the drive and arrest mechanism urging the objective adjuster and the control structure to move together through said positions successively, the electromagnets arresting the objective adjuster in accordance with that subject-distance setting which has been identified by the comparison evaluator while leaving the control structure unarrested and free to continue to move through further positions successively;
   a shutter;
   a shutter trigger causing the shutter to open when the control structure reaches one of said further positions past that position at which the objective adjuster is arrested;
   an electronic exposure timer for timing an exposure, the exposure timer including a summer connected to each of the photo-detectors in the second photodetector array for generating a sum signal corresponding to the reciprocal of the number of photodetectors contained in the second photodetector array, said sum signal being characteristic of prevailing light intensity at a subject being photographed; and
   a start switch starting the exposure timer when the objective adjuster and control structure reach a predetermined position.

* * * * *